A. WEILAND.
CARBURETER FOR INTERNAL COMBUSTION ENGINES.
APPLICATION FILED NOV. 30, 1917.
1,286,856.
Patented Dec. 3, 1918.
3 SHEETS—SHEET 2.
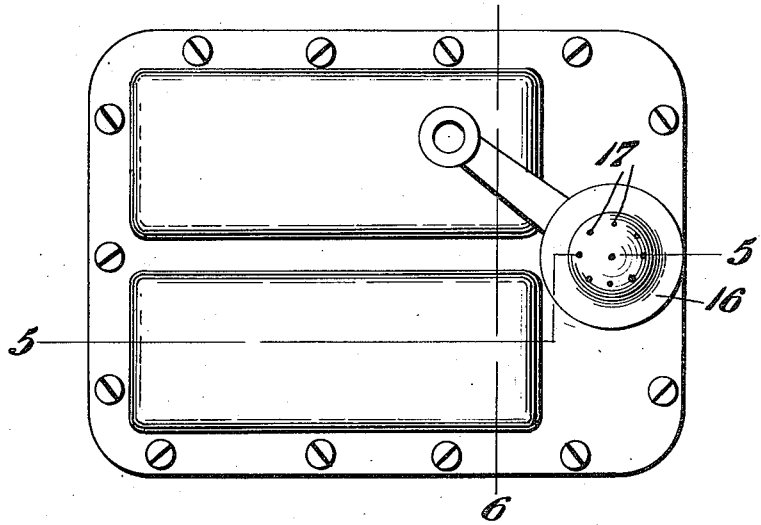
Fig. 4.
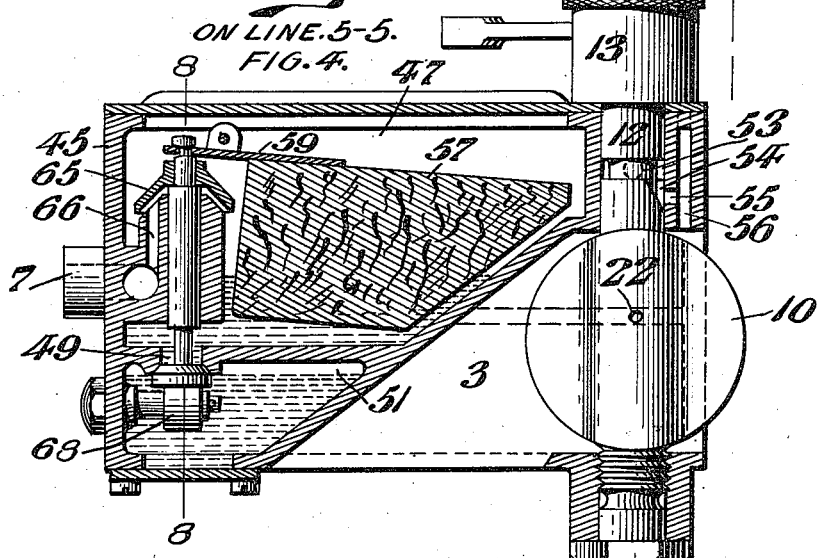
Fig. 5.
ON LINE 5-5.
FIG. 4.
Inventor
Alfred Weiland
Robert M. Barr Attorney A. WEILAND.
CARBURETER FOR INTERNAL COMBUSTION ENGINES.
APPLICATION FILED NOV. 30, 1917.
1,286,856.
Patented Dec. 3, 1918.
3 SHEETS—SHEET 3.
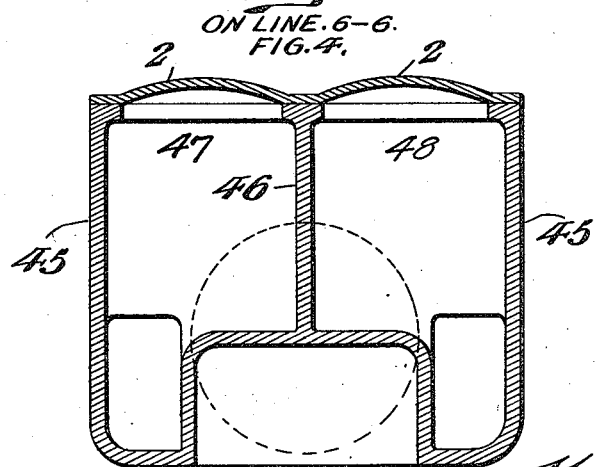
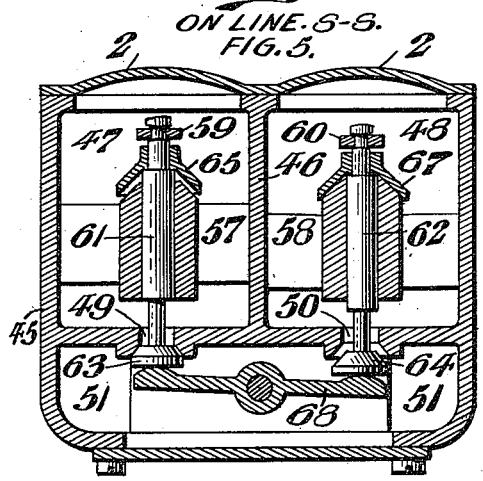
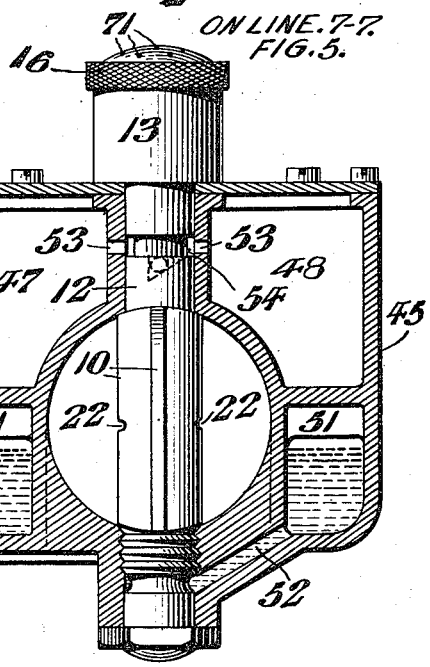

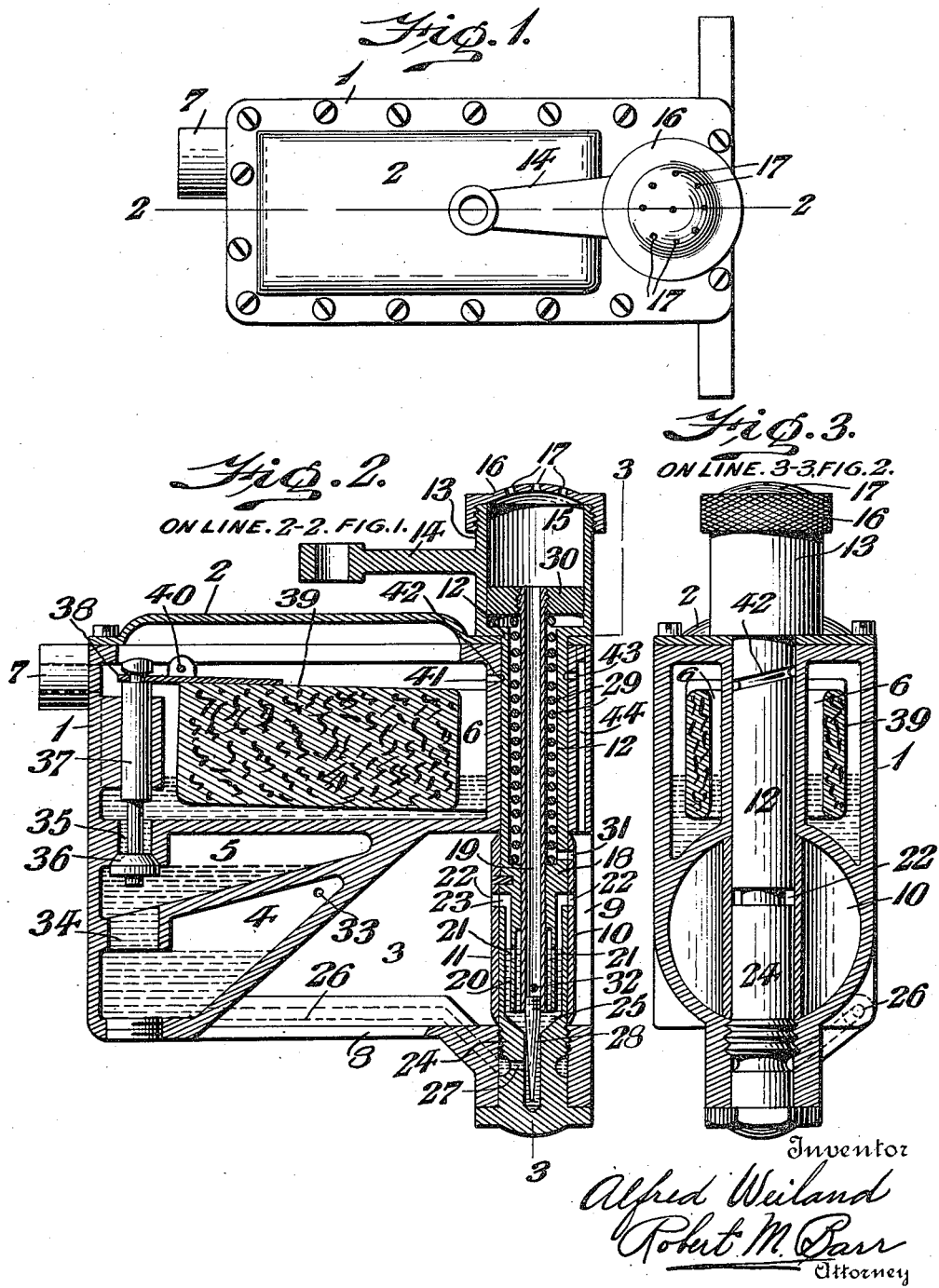

UNITED STATES PATENT OFFICE.

ALFRED WEILAND, OF PHILADELPHIA, PENNSYLVANIA.

CARBURETER FOR INTERNAL-COMBUSTION ENGINES.

1,286,856.  Specification of Letters Patent.  Patented Dec. 3, 1918.

Original application filed March 6, 1917, Serial No. 152,528. Divided and this application filed November 30, 1917. Serial No. 204,546.

*To all whom it may concern:*

Be it known that I, ALFRED WEILAND, a citizen of the United States, residing at Philadelphia, in the county of Philadelphia and State of Pennsylvania, have invented a certain new and useful Improvement in Carbureters for Internal-Combustion Engines, of which the following is a specification.

This application is filed as a division of application Serial Number 152,528 and the invention relates to a carbureter for internal combustion engines and having more particular reference to the regulation of the mixture with respect to the speed and load.

It is an object of the invention to provide means under the control of pressure conditions in the motor intake for definitely proportioning the liquid fuel and air so that irrespective of running conditions, the motor receives a proper and efficient mixture for the required condition. It is an object therefore to provide means for automatically supplying a mixture rich in liquid fuel under starting or slow speed conditions and which mixture can be automatically varied or controlled in such a manner that under high speed conditions, for example, or conditions of relatively light load, the liquid fuel will be automatically starved or cut down while the quantity of air in the mixture is proportionately increased.

For the purpose of illustrating my invention, I have shown in the accompanying drawings one form thereof which is at present preferred by me, although it is to be understood that the various instrumentalities of which my invention consists can be variously arranged and organized and that my invention is not limited to the precise arrangement and organization of the instrumentalities as herein shown and described.

Referring to the drawings:

Figure 1 represents a plan of a carbureter embodying my invention.

Fig. 2 represents a section on line 2—2 of Fig. 1.

Fig. 3 represents a section on line 3—3 of Fig. 2.

Fig. 4 represents a plan of a modified form of the invention.

Fig. 5 represents a section on line 5—5 of Fig. 4.

Fig. 6 represents a section on line 6—6 of Fig. 4.

Fig. 7 represents a section on line 7—7 of Fig. 5.

Fig. 8 represents a section on line 8—8 of Fig. 5.

1 designates the casing of the carbureter which is provided with a removable cover or top 2 by means of which access is had to the interior of the carbureter for purposes of repair or otherwise, as will be understood. In the present instance, the casing 1 is so constructed as to form a carbureting chamber 3, a main fuel reservoir 4, a supplemental or storing reservoir 5 and an auxiliary reservoir 6, the latter having direct connection and communication with a source of low level liquid supply (not shown) by way of the pipe 7. The carbureting chamber 3 communicates with the atmosphere through the main air inlet passage 8 and discharges into the motor intake by way of the outlet 9 and this outlet portion is of course subject to the pressure conditions existing in the aforesaid motor intake.

As here shown the carbureter nozzle or the mixture jet is formed in a part of the throttle valve controlling means and is located substantially transversely of the chamber 3 so that when the throttle is open, the air entering by way of the passage 8 and traversing the chamber 3 is divided and passes to opposite sides of the nozzle structure. Referring to Fig. 2, 10 designates the throttle valve which is suitably shaped and located to cut off the carbureting chamber 3 from the motor intake as desired, and in the present instance, this valve is formed with a central sleeve 11 which is fixed to the tubular stem 12 of the throttle valve operating means. Thus the stem 12 has a bearing in the carbureter casing 1 and terminates in an enlarged head 13 which seats upon the casing top and carries the throttle operating lever 14 by which the parts are moved as required. As here shown, the head 13 forms a chamber 15, the otherwise open end of which is closed by a cap 16 provided with a plurality of air inlet openings 17 for a purpose presently to be described. The stem 12 is further provided with an intermediate body portion 18 which serves as a guide-bearing for the tubular plunger 19 and also provides the circumferential extension 20 which is arranged concentrically of the plunger 19 and terminates at a point substantially below the normal liquid fuel level. In this connection, it will be noted that a plurality of openings 21 are provided in the said extension at substantially the normal level line of the liquid fuel in main fuel reservoir 4, and serve to permit air to escape from the interior of said extension and carry liquid fuel to the jet outlets 22. These outlets 22 are formed respectively at opposite sides of the throttle valve 10 and communicate with the space 23 between the extension 20 and the sleeve plug 24 which is threaded into the casing 1 in alinement with the stem 12 and has its tubular portion encircling the extension 20 to form the aforesaid space 23. The body portion of the plug 24 forms a jet reservoir 25 which is supplied with fuel from the main reservoir 4 by way of the passage 26 which has communication with the inlet 27 in the plug 24.

28 designates a needle valve for controlling the supply of liquid fuel to the mixture nozzle and in the present instance this valve is connected to the lower end of the tubular plunger 19, so that as the said plunger moves in one direction or the other, the valve 28 is correspondingly shifted. Under normal conditions, the valve 28 is open but is under the control of pressure conditions in the motor intake acting in opposition to a coiled spring 29 which bears against a fixed part of the stem 12 at one end and against the movable piston 30 at the opposite end. The piston 30 in the present instance is mounted for free sliding movement within the chamber 15. Thus the normal tendency of the spring 29 is to raise the piston 30, plunger 19 and valve 28 to maintain the fuel inlet fully open, while a reduction in pressure beneath the plunger 30, or rather within the stem 12, below a definite pressure causes the spring to be overcome and the valve 28 to be partially closed. It will be noted that a port 31 is provided to form a communication between the interior of the stem 12 and the motor intake while a similar port 32 provides for the passage of air from the interior of the plunger 19 to the jet chamber 25. This port 32 is preferably below the normal liquid level or at least the level under starting and slow speed conditions so that the air drawn through is relatively saturated with liquid fuel.

Referring now to the main reservoir 4 for liquid fuel, 33 designates an air vent suitably formed in the casing 1 and communicating with the said reservoir above the normal liquid level whereby the liquid fuel is supplied by gravity action to the jet as will be understood. 34 designates an outlet leading from the storing reservoir 5 to the main reservoir 4 and having its mouth normally below the fuel level, so that the outlet is liquid sealed and the liquid from the storing reservoir 5 gradually replaces the liquid used from the main reservoir 4 through the action of the air bubbling or rising through the liquid sealed outlet 34.

35 designates the outlet from the auxiliary chamber 6 to the storing reservoir 5, this outlet, in the present instance, terminating well within the chamber 5 and having its mouth normally sealed by the stored liquid fuel. A valve 36 is arranged to control the opening and closing of the outlet 35 and for this purpose is provided with a reciprocable stem 37 which is connected to a lever 38 which carries a float 39 and has its fulcrum 40 intermediate the two points of connection, so that when the float rises, the valve 37 is lowered and vice versa. The auxiliary chamber 6 is adapted to be subjected to the pressure conditions in the motor intake and to that end the casing wall is provided with an opening 41, the opening and closing of which is controlled by the movement of the stem 4, and as here shown, the said stem is annularly grooved as shown at 42 to form a passage or connecting conduit with a port 43 which communicates by way of the channel 44 with the motor intake. Thus in one position of the throttle, the groove 42 will provide a full size communicating passage between the ports 41 and 43 and in another position of the throttle this communicating passage will be reduced in area to a proportionate extent both with the end in view of maintaining a substantially constant vacuum within the chamber 6.

In Figs. 4 to 8 inclusive, I have illustrated a modified form of the carbureter in which there is a plurality of liquid fuel chambers of the type shown in Fig. 2, one set of such chambers being arranged at one side of the carbureter and the other set at the opposite side and the construction affording means to continuously supply liquid fuel to the jet nozzle while at the same time means are provided for replenishing an exhausted reservoir. The general operation of this multiple set type is to alternately provide a fuel feeding reservoir and a reserve fuel reservoir which comes into operation when the former is exhausted and during the time that the said exhausted chamber is automatically being replenished.

Referring to Figs. 5, 6, 7 and 8, 45 designates the carbureter casing which is longitudinally sub-divided by a partition 46 or the like into two auxiliary chambers 47 and 48 which have communication respectively by way of the outlets 49 and 50 with a main reservoir chamber 51 which supplies the fuel jet through the port 52. In view of the fact that the jet structure as well as certain of its adjuncts are similar in construction to the construction described in connection with Fig. 2, it is deemed unnecessary to here give a repetition of its details and therefore the essential parts necessary to an understanding of the operation of the modified form of the carbureter will be given in same reference numerals as applied to Fig. 2. In connection with the regulation of the vacuum conditions in the chambers 47 and 48, it will be noted that each is provided with a port 52 and 53, respectively, opening against the stem 12 of the throttle sleeve and so positioned as to aline with a groove and beveled notch 54 formed in the stem 12 so that one or the other of the said ports may be brought into communication with the port 55 leading to the channel 56 which has communication with the motor intake.

57 and 58 designate, respectively, float members located in the chambers 47 and 48 respectively connected by the pivoted levers 59 and 60, valve stems 61 and 62 with the valves 63 and 64 which control the outlets 49 and 50 from the respective auxiliary chambers 47 and 48. The valve stem 61 is provided with a shoulder part which serves as a support for a loosely mounted valve 65 which has sufficient clearance with respect to the lever 59 as to open the inlet channel 66 for the liquid fuel and which channel communicates with the low level liquid supply. A similar valve member 67 is carried by the stem 62 and operates in a similar manner to control the liquid fuel inlet for the chamber 48, as will be understood.

68 designates a lever pivotally mounted within the main reservoir 51 and having its ends respectively in contact with the valves 63 and 64 so that movement of either under actuation of the corresponding float will cause the other valve to move in the opposite direction, thus making positive provision for closing one of the outlet valves when conditions make it necessary for the other to be open. The main fuel reservoir 51 is subject at all times to atmospheric pressure through the air vent 69 which is suitably formed in the casing and terminates above the normal liquid level in the said reservoir 51.

The general operation of the forms of my invention is the same, since the complete unitary device acts as a means for feeding a gaseous mixture to a motor, controlling and proportioning the mixture in accordance with pressure variations in the motor intake and also providing a means for continuously supplying liquid fuel in regulated quantities as required. Referring first to the throttle structure and its adjuncts, it will be noted that the throttle valve is substantially of hollow or tubular construction at its central portion and within which the parts are so arranged and coördinated as to form not only the main fuel jet of the carbureter but also an auxiliary reservoir embodying air and fuel supply to form an auxiliary jet which is particularly advantageous for starting or slow speed conditions. Assuming these latter conditions to exist and the throttle to be in its closed position, the fuel assumes a level in the chamber 25 substantially co-incident with the two ports 21 and since at this time also but one of the outlets 22 is directly subject to the suction of the motor intake the other outlet 22 becomes an inlet for air from the main air opening 8. Thus under a starting condition, air is drawn through the inlet 22 into contact with the liquid fuel and discharges through the outlet 22 to the motor intake while a second body of air is drawn through the ports 17, and passes by way of the ports 32 beneath the level of the fluid and bubbles its way to the outlet 22 so that the resulting combined mixture is a saturated mixture well adapted for the requirements of starting or slow speed work. Under running conditions of the motor, the throttle jet becomes less of an auxiliary or priming device since it is then transformed into the main fuel jet and with the throttle open, the suction is generally sufficient to practically empty the chamber 25 of any surplus liquid fuel and the carbureting chamber draws directly upon the main fuel reservoir for its supply. In the present instance, I have provided an automatic regulation as an adjunct of the throttle valve and which operates to move the needle valve 28 in accordance with pressure conditions in the motor intake and the operation of this adjunct will be understood by reference to the spring pressed plunger 19 which is normally held in such a position as to lift the valve 28 from its seat and provide a full opening for the liquid fuel. As suction develops in the motor intake under running conditions, the port 31 provides a communication by which the piston 30 is pulled in an opposite direction to the action of the spring and as the vacuum lowers below the adjustment of the spring, the plunger 19 is moved to shift the valve 28 toward its seat and thus cut down the supply of liquid fuel. In this manner, the liquid fuel may be definitely proportioned to the air according to motor requirements and a substantially definite mixture provided for running conditions whether under light load, heavy load, slow speed or high speed. It should also be noted that as the throttle valve is opened, the port 22, which in closed position of the throttle is an air inlet, becomes an additional discharge outlet for the fuel and these fuel outlets are arranged to discharge into the main carbureting chamber adjacent the central portion thereof so that all of the fuel is picked up by the air out of contact with the walls of the chamber.

What I claim is:

1. In a carbureter, a casing having a main fuel reservoir, a carbureting chamber and a main air supply to said chamber, a throttle valve having a tubular part having openings therein, said openings in closed position of the throttle being respectively toward the main air supply and toward the motor intake, a fuel jet in said throttle valve adapted to discharge through one of said outlets in closed position of the throttle and both outlets in open position of said throttle, means to supply liquid fuel from said main reservoir to said fuel jet, and means to deliver an auxiliary air supply to said fuel jet.

2. In a carbureter, a casing forming a main fuel reservoir, a carbureting chamber and a main air supply to said chamber, a throttle valve having a tubular part provided with an outlet to the motor intake, a fuel jet in said throttle valve adapted to discharge through said outlet, means to supply liquid fuel from said main reservoir to said fuel jet, and means to automatically vary the quantity of said supply according to pressure conditions in said motor intake.

3. In a carbureter, a casing forming a main fuel reservoir, a carbureting chamber and a main air supply to said chamber, a throttle valve having a tubular part provided with an outlet, a fuel jet in said throttle valve adapted to discharge through said outlet, means to supply liquid fuel from said main reservoir to said fuel jet, means to deliver a supply of air to the interior of said throttle valve, and pressure controlled means for varying the fuel supply in accordance with pressure conditions in the motor intake.

4. In a carbureter, a casing forming a fuel reservoir, a carbureting chamber, and a main air supply to said chamber, a throttle valve having a tubular part provided with an outlet, a fuel jet in said throttle valve having communication with said fuel reservoir, a valve controlling said communication, means normally operating to hold said valve open and means acting in opposition to said holding means to close or partially close said valve.

5. In a carbureter, a casing forming a fuel reservoir, a carbureting chamber, and a main air supply to said chamber, a throttle valve having a tubular part provided with an outlet, a fuel jet in said throttle valve having communication with said fuel reservoir, a valve controlling said communication, a piston secured to said valve, a spring acting against said piston to hold said valve open, and means to subject one side of said piston to the pressure conditions in said motor intake whereby the suction is opposed to said spring to close or partially close said valve according to the motor requirements.

In testimony whereof, I have hereunto signed my name.

ALFRED WEILAND.